Figure 1:
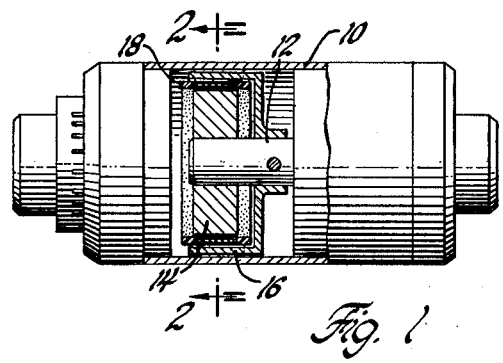

June 8, 1965      A. G. LAUTZENHISER      3,188,540

SIGNAL PICK-OFF AND D.C. TORQUER

Original Filed April 12, 1962

INVENTOR.
Argyle G. Lautzenhiser
BY
Paul J. Ethington
ATTORNEY

United States Patent Office 3,188,540
Patented June 8, 1965

3,188,540
SIGNAL PICK-OFF AND D.C. TORQUER
Argyle G. Lautzenhiser, Essex, Mass., assignor to General Motors Corporation, Detroit, Mich., a corporation of Delaware
Continuation of application Ser. No. 187,107, Apr. 12, 1962. This application Aug. 26, 1964, Ser. No. 393,483
5 Claims. (Cl. 318—23)

This application is a continuation of Serial No. 187,107, filed April 12, 1962.

This invention relates to a combined signal pick-off and torque generator and more particularly to the improvement thereof wherein a permanent magnet provides both the magnetic field for the signal pick-off and the magnetic field for the torque generator.

One form of the prior art regarding the combination of a signal pick-off and torque generator comprises a rotor having an inductive pick-off coil mounted thereon responsive to magnetic flux linking the coil by virtue of the magnetic field of a stationary alternating magnetic field generator. An angular displacement of the rotor with respect to the generator results in a change in magnetic flux linking the coil thereby inducing a voltage in the coil. This voltage is amplified and converted into a D.C. control voltage which is applied to appropriate torquing coils located on the rotor within the field of a permanent magnet. Current flowing in the coils due to the D.C. control voltage flows in a direction so as to coact with the field of the permanent magnet to create a force acting on the rotor to angularly torque the rotor back to its original position. However, a combination signal pick-off and torque generator as described requires two magnetic flux producing means, i.e. one for providing a magnetic field for the signal pick-off and another for providing a magnetic field for the torque generator. Furthermore, the use of a variable inductance pick-off coil in such devices may result in unwanted reaction torques acting on the rotor due to the magnetic field linking the coil.

In accordance with this invention, a combined signal pick-off and torque generator is provided which does not require two magnetic flux producing means and which does not use signal pick-offs of the variable inductance coil variety. This is accomplished with a permanent magnet and support means supporting signal pick-off means responsive to magnetic flux density, such as a Hall effect device, and torque generating means including torquing coils which are located in the field of the permanent magnet. The signal pick-off means develop output voltages indicative of displacements of the magnet with respect to the support means due to variations in magnetic flux density applied to the signal pick-off means. Output circuit means may be connected with the signal pick-off means so as to obtain output signals therefrom indicative of displacements of the magnet with respect to the support means. Circuit control means may be connected with the signal-pick-off means responsive to the voltages developed thereby and operative to develop D.C. control voltages of polarity and magnitude depending on the direction and extent, respectively, of relative displacements between the permanent magnet and the support means. The torquing coils may be excited by the D.C. control voltages or externally derived D.C. voltages so as to obtain D.C. current flow therein in a direction to coact with the magnetic field of the permanent magnet and thereby create forces acting on the permanent magnet to torque the magnet back to its original position with respect to the support means.

Figure 2:
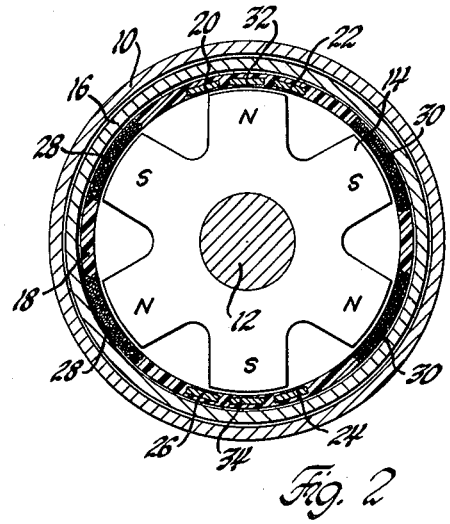
Figure 3:
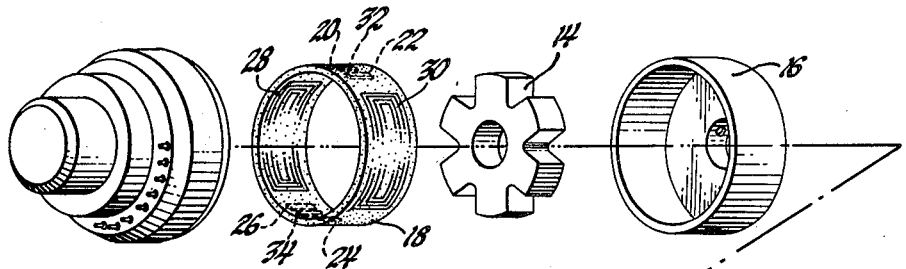
Figure 4:
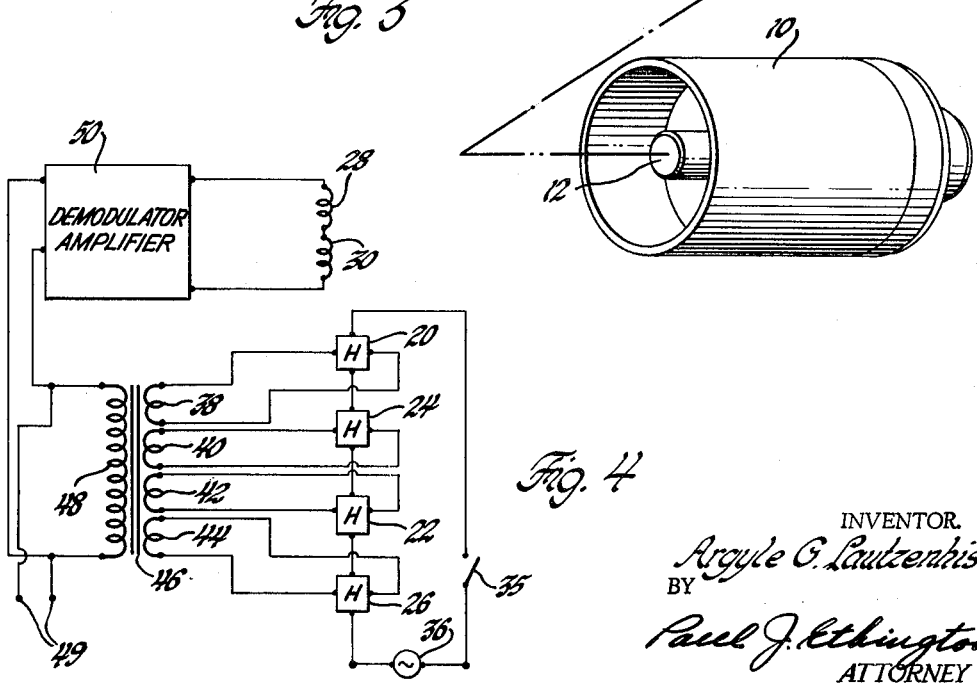

A more complete understanding of this invention may be had from the detailed description which follows taken with the accompanying drawings in which:

FIGURE 1 is a plan view partly in section of one embodiment of the invention;
FIGURE 2 is an end view looking in the direction of the arrows 2—2 in FIGURE 1;
FIGURE 3 is an exploded view in perspective of FIGURE 1;
FIGURE 4 is a schematic circuit diagram of circuit means which may be used with the embodiment of the invention shown in FIGURES 1, 2 and 3;

Referring now to the drawings and more particularly to FIGURE 1, there is shown a cylindrical housing 10 which may take the form of the outer casing of an inertial sensing device. An angularly rotatable shaft 12 is connected with an inertial element in the casing 10. Suitably secured on the shaft 12 is a six-pole permanent magnet rotor 14, the poles of which are polarized radially of the axis of rotation as is shown in FIGURE 2. A soft iron annular ring 16 is secured to the shaft 12 for rotation therewith and provides a magnetic return path for the magnetic flux developed by the permanent magnet rotor 14 whereby the rotor 14 will not have a preferred position due to hysteresis causing reaction torques. A stator comprising an annular ring 18 of non-magnetic material, such as epoxy or aluminum, is mounted to the inner side of the annular ring 16. Hall effect devices 20, 22, 24 and 26 are embedded in the stator 18 such that the devices 20 and 22 and 24 and 26 are respectively positioned near the pole faces of diametrically opposed poles as is shown in FIGURE 2 so as to be traversed by magnetic flux of equal value, including both main flux and fringing effect flux, when the rotor 14 is in its null position. Torquing coils 28 and 30 are embedded in the stator 18 and respectively positioned near the pole faces of adjacent poles of the rotor 14 as shown in FIGURES 2 and 3 whereby each coil is linked by magnetic flux of equal value when the rotor 14 is in its null position. Magnetoresistive devices 32 and 34 are also embedded in the stator 18 and are located diametrically opposed from each other with respect to the shaft 12 and midway between the Hall effect devices 22 and 20 and 24 and 26, respectively.

The Hall effect devices 20, 24, 22 and 6 are connected together in series with a switch 35 across a constant alternating voltage source 36 provided for applying excitation to the devices as is shown in FIGURE 4. The Hall effect devices are preferably selected such that they exhibit substantially the same characteristics so that when the magnetic flux applied to each device is equal in magnitude the output voltage developed by each of the Hall effect devices will be equal. Transformer primary windings 38, 40, 42 and 44 on a transformer core 46 are connected across opposite ends of the Hall effect devices 20, 24, 22 and 26, respectively. The primary windings 38 and 40 are oppositely wound on the transformer core 46 with respect to the primary windings 42 and 44 so that magnetomotive forces created by current flowing in the windings cancel out when the output voltage developed by each of the Hall effect devices is equal. A pair of output terminals 49 are connected across a secondary winding 48 on the transformer 46 so as to obtain output signals. The secondary winding 48 on the transformer core 46 is connected with a demodulator-amplifier 50 which is provided for converting the A.C. voltages induced in the secondary winding 48 into D.C. control voltages. The magnetoresistive devices 32 and 34, which are provided for compensating for variations in magnetic field strength of the magnet 14, may be connected in a separate circuit for feeding information to computer means which may be operative to automatically correct for changes in field strength of the magnet 14.

It is well known that when current flows in a Hall effect device, such as 20, 22, 24 or 26, and a magnetic field is applied perpendicularly to the direction of current flow, an electrical potential will be generated by the device in a direction which is perpendicular to both the direction of current flow and the magnetic field. Thus upon closure of switch 35, an alternating potential will exist across each of the Hall effect devices 20, 22, 24 and 26 indicative of the magnitude of magnetic flux traversing the device. However, since the Hall effect devices are positioned with respect to the rotor 14 such that the magnetic flux traversing each Hall effect device is equal in magnitude when the rotor is in its null position, the output voltage generated by each Hall effect device will be equal when the rotor 14 is in its null position. Thus, current will flow in the primary windings 38 and 40 so as to create magnetomotive forces equal in magnitude and opposite in effect to that created by current flowing in the primary windings 42 and 44 and hence no output voltage will appear across the secondary winding 48.

However, if the rotor 14 is angularly displaced with respect to the stator 18, the magnetic flux traversing each of the Hall effect devices will be unequal in magnitude since one of the Hall effect devices near one of the poles of the rotor 14 will be traversed by more main flux and less fringing effect flux and the other Hall effect device near the pole will be traversed by less main flux and more fringing effect flux resulting in variations in voltages generated by the Hall effect devices and hence variations in voltages existing across the primary windings 38, 40, 42 and 44 whereby a net magnetomotive force will be applied across the primary side of the transformer core 46 and thus an output voltage will exist across the secondary winding 48. This output voltage will be applied to the input of the demodulator-amplifier 50 and converted into a D.C. control voltage having a polarity whereby a D.C. current will flow through the torquing coils 28 and 30 in additive directions, i.e., since the torquing coils 28 and 30 are located in the magnetic field of the permanent magnet rotor 14 and are perpendicular to the lines of magnetic flux, the D.C. current flowing in the torquing coils will coact with the magnetic field so as to create forces acting on the rotor in a direction opposed to the direction of angular displacement of the rotor from its null position.

The operation of the embodiment of the invention described above may be explained with the following example. If the rotor 14 is angularly displaced in a counterclockwise direction with respect to the stator 18, the magnetic flux traversing the Hall effect devices 20 and 24 will increase in magnitude and the magnetic flux traversing the Hall effect devices 22 and 26 will decrease in magnitude. Thus the output voltages generated by the Hall effect devices 20 and 24 will increase and the output voltages generated by the Hall effect devices 22 and 26 will decrease. The magnetomotive forces created by the current flowing through primary windings 38 and 40 will increase and the magnetomotive forces created by the current flowing through the primary windings 42 and 44 will decrease whereby an output voltage will exist across the secondary winding 48 indicative of the net magnetomotive force existing across the primary side of the transformer 46. A D.C. control voltage will be developed by the demodulator-amplifier 50 of a polarity such that a D.C. current will flow through the torquing coils 28 and 30 in a direction to coact with the magnetic field of the permanent magnet rotor 14 so as to create a force acting on the rotor 14 in a clockwise direction to thereby torque the rotor back to its null position. Similarly, if the rotor 14 is angularly displaced in a clockwise direction the output voltages generated by the Hall effect devices 22 and 26 will increase and the output voltages generated by the Hall effect devices 20 and 24 will decrease whereby a D.C. control voltage will be developed by the demodulator-amplifier 50 of opposite polarity from the example described above. Thus a D.C. current will flow in the torquing coils 28 and 30 in a direction so as to coact with the magnetic field of the magnet 14 to create a force acting on the rotor 14 in a counterclockwise direction to thereby torque the rotor back to its null position.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A signal pick-up and torque generator for a rotatable member comprising a first body including means for establishing a plurality of permanent magnetic poles circumferentially about an axis of the first body, a second body coaxially disposed with respect to the first body, mounting means for permitting relative rotation between the first and second bodies about the common axis thereof in accordance with rotation of said member, a pair of Hall effect devices mounted on the second body for producing output signals related to the magnitude of a magnetic field incident thereon, the Hall effect devices being disposed adjacent the magnetic poles when the first body occupies a reference position with respect to the second body such that relative rotation of the bodies complementaly varies the field incident upon the devices, output means connected to the Hall effect devices for producing displacement signals of a character corresponding with the direction and extent of relative displacement between the bodies, a torquing coil carried by the second body adjacent one of the magnetic poles of the first body, and control means connected to receive the displacement signals and to energize the torquing coil thereby to effect relative rotation between the bodies to return the bodies to the reference position.

2. A signal pick-off and torque generator for a rotatable body comprising a permanent magnet rotor adapted to be rotated by said body about an axis of rotation and having a plurality of radially extending poles, a stator coaxially disposed with respect to the rotor and carrying two Hall effect devices for producing output signals related to the magnitude of a magnetic field incident thereon, the Hall effect devices being arcuately displaced so as to be normally disposed adjacent circumferentially opposite sides of a pole of the rotor when the rotor is in a reference position whereby angular displacement of the rotor complementally varies the field incident upon the devices, output means connected to the Hall effect devices for producing displacement signals of a character corresponding with the direction and extent of angular displacement of the rotor, a torquing coil carried by the stator adjacent a pole of the rotor, and control means connected to receive said displacement signal and to energize the torquing coil thereby to tend to return the rotor to said reference position.

3. In combination, a signal pick-off and torque generator comprising a permanent magnet rotor having a plurality of poles extending radially from the axis of rotation thereof, a stator coaxially disposed with respect to the rotor and supporting two Hall effect devices for producing respective output signals related to the quantity of flux traversing the devices, and a torquing coil within the magnetic field of the rotor, the Hall effect devices being disposed adjacent circumferentially opposite sides of respective poles of the rotor whereby devices are equally traversed by magnetic flux when the rotor is in a reference position and circuit control means connected with the devices responsive to the output signals developed thereby to develop D.C. control voltages of magnitude and polarity indicative of the extent and direction, respectively, of angular displacement of the rotor with respect to the stator, the torquing coil being connected with the circuit control means and responsive to the control signal voltages developed thereby so as to obtain direct current flow in the coil in a direction to coact with the magnetic field of the permanent magnet rotor to develop a force acting on the rotor in a direction to torque the rotor back to the reference position.

4. In combination, a signal pick-off and torque generator comprising a permanent magnet rotor having a plurality of poles extending radially outward from an axis of rotation, an annular stator coaxially disposed with respect to the rotor, the stator supporting two Hall effect devices and a torquing coil within the field of the rotor, the devices located adjacent circumferentially opposite sides of one of the poles of the rotor whereby each device is traversed by magnetic flux of equal magnitude when the pole is angularly centered between the devices, the devices being operative to develop output voltages in accordance with changes in the magnitude of flux traversing the devices whereby the output voltage developed by the device toward which the pole is angularly displaced is greater than that developed by the other device, and circuit control means connected with the devices responsive to the output voltages developed thereby to develop D.C. control voltages of magnitude and polarity indicative of the extent and direction, respectively, of angular displacement of the rotor with respect to the stator, the torquing coil connected with the circuit control means and responsive to the control signal voltages developed thereby so as to obtain direct current flow in the coil in a direction to coact with the magnetic field of the permanent magnet rotor to develop a force acting on the rotor in a direction to torque the rotor back to its original angular position with respect to the stator.

5. In combination, a signal pick-off and torque generator comprising a permanent magnet rotor having a plurality of pairs of outwardly extending poles, the poles of each pair of poles located diametrically opposite each other with respect to the axis of rotation of the rotor, an annular stator of non-magnetic material coaxial with the axis of rotation of the rotor and disposed outwardly from the poles of the rotor, the stator supporting two pairs of Hall effect devices, the devices of each pair of devices located in the magnetic field of one of the poles whereby the magnetic flux traversing each device is equal when the pole is angularly centered between the pair of devies, the devices being operative to develop output voltages in accordance with angular displacements of the rotor with respect to the stator whereby the output voltage developed by the device of each pair of devices toward which the pole is angularly displaced will be greater than that developed by the other device of each pair of devices, circuit control means connected with the devices responsive to the voltages developed thereby and operative to develop D.C. control voltages of magnitude and polarity indicative of the extent and direction, respectively, of angular displacement of the rotor with respect to the stator, and first and second torquing coils supported by the stator whereby each coil is linked by the field of two adjacent poles of the rotor, the torquing coils being connected with the circuit control means and responsive to the D.C. control voltages so as to obtain direct current flow in the coils in a direction to coact with the magnetic field of the permanent magnet rotor to develop forces acting on the rotor to torque the rotor into its original angular position with respect to the stator.

References Cited by the Examiner
UNITED STATES PATENTS

| | | | |
|---|---|---|---|
| 2,536,805 | 1/51 | Hansen | 318—23 |
| 2,669,126 | 2/54 | Simmons et al. | 74—5.6 |
| 2,814,743 | 11/57 | Johnson | 310—36 |

JOHN F. COUCH, *Primary Examiner.*